Figure 1:
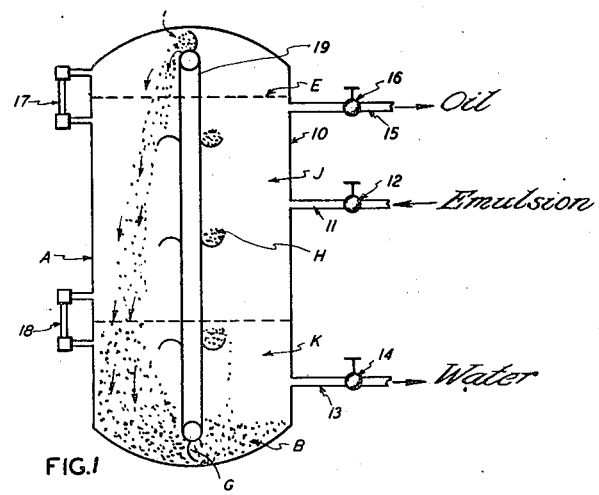

Jan. 23, 1934.    W. F. VAN LOENEN    1,944,479
METHOD OF TREATING EMULSIONS
Filed May 21, 1932

WILLIAM F. VAN LOENEN
INVENTOR
ATTORNEY

Patented Jan. 23, 1934

1,944,479

UNITED STATES PATENT OFFICE 1,944,479

METHOD OF TREATING EMULSIONS

William F. Van Loenen, Buena Park, Calif., assignor to L. Blake-Smith, San Francisco, Calif.

Application May 21, 1932. Serial No. 612,845

15 Claims. (Cl. 196—3)

The object of my invention is to provide a method for treating emulsions with granular solid bodies which are insoluble or slowly soluble in any of the constituents of the emulsion and which produce their resolving effect principally by reason of a preferential wettability for one or other of the emulsion constituents.

My present invention does not comprehend any new or novel treating agent but applies equally to all known agents and to such as may hereafter be discovered, provided only that such agent be a comminuted solid and that it have a specific gravity materially different from that of the emulsion. My invention, as herein disclosed, comprises a method of so applying agents of this class to an emulsion as to produce the greatest efficiency and rapidity of action consistent with the properties of the agent.

It is well known that some solid substances have a strong surface attraction for the aqueous constituent of an oil-water emulsion and a very much lower attraction for the oily constituent, while other materials have at least as great an attraction for oil as for water and in some cases an even greater attraction. It is known to treat emulsions with sand, hay, excelsior and other substances which, when once wetted with water, will thereafter lay hold of water particles with which they may come into contact and tend to coalesce such particles into larger drops. It has also been discovered that when a mixture of minerals such, for instance, as silica and iron sulfid (the first having a superior attraction for water and the second a superior attraction for oil) is agitated with an oil-water emulsion under suitable conditions, the emulsion is resolved into its constituents and will separate by gravitation into a supernatant oily layer and a subnatant aqueous layer. The breaking of emulsions by the use of these and similar substances is the invention of others and I lay no claim thereto, my present invention residing solely in the manner in which the treating agent is applied to the emulsion.

It is also known to treat emulsions with granular solids by various physical methods; such as to form the grains into a bed or pack and pass the emulsion therethrough (percolation); to form a layer of the grains on a filter cloth and pass the emulsion through such layer under pressure (filtration), or to maintain the grains in suspension in a turbulent mass of the emulsion and its resolution products by stirring with paddles, agitating with streams of gas or air, circulatory pumping or other means of maintaining the fluid in the state of agitation required to suspend the relatively heavy grains employed.

In all of these methods, as well as in that which I hereinafter describe, the emulsion is resolved by relative movement of the solid grains and the dispersed liquid particles of the emulsion. In percolation and filtration the grains are held in a fixed position and the suspended particles collide with them in passing through the interstices of the pack or layer. In the agitation systems turbulence is utilized to raise the relatively heavy grains from the bottom of the retaining vessel and to cause more or less rapid movement of the grains through the liquid mass, by which the grains are caused to collide with the dispersed liquid particles.

The percolation and filtration methods have signally failed to give satisfactory results in the treating of emulsions. First, if any worth-while contact between grains and particles is to be effected, the grains must be relatively small and the interstices correspondingly narrow, and as many emulsions, particularly the more resistant ones, are extremely viscous, the throughput of such packs is small. Second, and also because of the necessarily fine interstices, the clay and other foreign matter which is almost invariably present in the emulsion clogs the filter so rapidly as to make its effective life very short. Third, the rapid passage of the emulsion through these narrow channels sets up the very turbulence which it is my object to avoid.

The agitation methods have produced better results, but these leave much to be desired. It is impossible to project the solid grains upwardly through the liquid mass without setting up a violent agitation, not only of the emulsion itself but also of the resolution products. This agitation tends strongly to reemulsify the products as they are set free, and while this reemulsification will seldom be complete in the earlier stages of the treatment, it offsets and destroys part of the initial resolving effect. Further, as the treatment proceeds and the proportion of dispersed liquid decreases, the reemulsifying effect due to agitation approaches constantly more closely to the resolving effect until the two come to a balance at some point short of complete resolution. With some readily resolved emulsions this point of balance may be within commercial limits, but with others more difficult to separate it may be, and often is, impossible to effect a commercially complete separation.

My improved method of applying granular solids to emulsions bears no relation whatever to percolation or filtration, but it is comparable with the agitation methods in the single sense that resolution is effected by moving the grains through a mass of liquid instead of moving the liquid through a mass of grains. It embodies, however, an entirely new concept in this respect, that instead of keeping the liquid mass in a state of turbulence in order to produce the requisite movement of the grains into contact with the dispersed liquid particles, I maintain the liquid in the nearest possible approach to a state of rest and produce the relative movement by applying mechanical force to the solid as a substantially separate material. This is in contrast to all other methods of accomplishing contact and relative movement, in which the mechanical force is applied directly to the liquid, as in percolation or filtration, or in which the mechanical force is applied indiscriminately to liquid and solid together, as in the use of paddles, air lift or pachuca tube.

In my improved method such movement of the liquid as may take place during the treatment is due primarily to the movement of the relatively small volume of solid through or within the liquid, and may readily be restricted within such limit as to avoid turbulence. In the prior methods above mentioned a very rapid movement of the liquid, always approaching and usually passing the lower limit of turbulence, is requisite to maintain effective contact between liquid and solid.

My invention of method can be given practical application in two forms which produce the same ultimate result by different movements within the mass of liquid undergoing treatment.

In the form described in an application filed by me on May 21, 1932 under Serial No. 612,846, the grains of solid agent used are specifically lighter than the lighter liquid of the emulsion; so that they come to rest on the upper surface of the liquid body, from which position they are transferred by mechanical means to a lower level in the liquid body, at which level they are released to again rise to the surface.

In the form described in the instant application the grains of solid agent are specifically heavier than the heavier liquid of the emulsion and come to rest on the bottom of the retaining vessel, from which point they are mechanically lifted to a higher point in or even to a point above the liquid body, being there released to travel downwardly through the liquid to the bottom of the vessel.

By operating in the manner hereinafter described I gain several important advantages which manifest themselves in an increase of as much as ten times in the speed with which any given emulsion may be broken by any given solid agent, in the ability to completely resolve many stubborn emulsions which heretofore could not be reduced to commercial specifications by any known method, and in the ability to demulsify at much lower temperatures than any heretofore used. The operation differs from the prior art agitation methods in the following particulars:

(a) The lifting and return of the granular solid is positive and it may be circulated very rapidly, thus greatly increasing its effectiveness of contact.

(b) The rapid circulation of the grains is accomplished without setting up a state of turbulence in the liquid mass, thus permitting the resolution products to stratify as they are set free.

(c) In avoiding turbulence, reemulsification is completely avoided.

(d) The granular solid may be lifted from the lower stratum (usually consisting of water) with only so much water as actually adheres to the grains, and thus each grain is free to contact with dispersed water particles. When the liquid mass is agitated to produce relative movement, the greater part of the grains are enclosed in relatively large water drops and only such grains as lie on the immediate surface of such drops can contact with dispersed particles, those in the interior of the drop being completely withdrawn from effective contact.

(e) The separated solid grains gravitate through the emulsion stratum in only a downward direction and as they collect the dispersed liquid they aid, by their superior weight, in carrying it rapidly out of the upper emulsion layer and placing it in the lower (aqueous) layer. In the agitation systems this effect is completely cancelled by the upward movement of the grain through the liquid which must precede its downward movement.

(f) Petroleum emulsions, which constitute the greater part of the emulsions commercially treated, almost always contain foreign bodies (clay, insoluble soaps or salts of naphthenic acids, colloidal bitumens and the like) which act as emulsifying agents. On the resolution of the emulsion these bodies tend to adhere to and coat over the solid grains, destroying their demulsifying power. By moving the coated grains through a maintained layer of water, and particularly by moving them in such manner as to cause the grains to abrade each other, this coating is washed off and the effectiveness of the solid indefinitely prolonged.

(g) By avoiding the use of gas or air to produce agitation, the formation of froth and the very annoying flotation of finer solid particles are likewise avoided.

(h) In mechanically lifting portions of the mass of grains which accumulates on the bottom of the treating vessel I am not limited as to the size of the grain nor to the use of solids with unusually high specific gravity and can use such coarse meshes as subside very rapidly through even very viscous emulsions, while suspension by turbulence requires either that the solid be ground to a very fine mesh or that it be of low specific gravity. The finer powers are often tenaciously retained in the oil layer; tending to produce reemulsification and causing a serious loss of solid treating agent and a not less serious contamination of the demulsified oil. A commercially complete separation of an emulsion of 40.0% has been obtained with grains of such size as to be retained on a 4-mesh screen.

(i) In avoiding turbulence the upper or oil layer is maintained relatively free from the water drops which are the first product of resolution and thus no granule movement is wasted in repeatedly weighting down these drops. When once removed from the oil layer, the water is retained in its proper stratum in the bottom of the retaining vessel, from which it may be removed as it unduly accumulates.

(j) The resolution products are at all times in the form of separated layers which may be partially withdrawn without any material removal of either solid or emulsion, the continuous operation of the apparatus being thus greatly facilitated.

Figure 2:
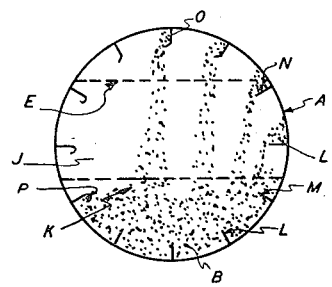

In order to point out more clearly the functional distinction between the agitation systems heretofore used and the novel method which I propose, reference is made to the attached drawing, in which Fig. 1 is a diagrammatic representation of the system which I propose, in the form herein described, and Fig. 2 is a similar representation of my proposed system, utilizing certain specific apparatus later referred to.

In these diagrams the dispersed liquid is assumed to be heavier than the continuous liquid and the solid grains to be heavier than either.

Referring to Fig. 1, A is the retaining vessel and B an accumulating layer of granular solid, F is an ordinary bucket elevator arranged to dip into the layer of grains as at G, to gently lift them through the liquid as at H, and to discharge them as at I, either above or below the upper liquid level E. The liquid body is shown as consisting of two strata, an upper oil layer J from which emulsion is gradually being removed by resolution and which in its upper portion may be substantially free from emulsion, and a water layer K. The arrows in this diagram indicate the downward travel of the solid grains only, the liquid being substantially undisturbed.

Referring to Fig. 2, the retaining shell A is in the form of a cylinder which is being slowly rotated counter-clockwise. Vanes L lift grains from the mass accumulating at B and discharge them at a higher point into the oil layer J as indicated at N or above the upper liquid level E as indicated at O. The arrows indicate the movement of the granules only, the oil and water strata J and K being substantially undisturbed. By using bent or curved vanes as indicated at O and P or by rotating at such speed as to produce a material centrifugal action, the final point of delivery of the grains into the liquid may be brought to either side of the upper center line of the shell.

It will be obvious that the separate removal of the granular solid from the lower to the upper part of the retaining vessel may be produced by several well-known mechanical means, of which but two are above indicated, but I have obtained particularly satisfactory results with the apparatus represented by the diagram of Fig. 2. This apparatus is fully described and claimed in an application filed May 21, 1932 under Serial No. 612,847.

The functional characteristic of my invention broadly is that two separate horizontal zones are defined and maintained within the treating apparatus. In one of these zones the emulsion is contacted with and resolved by the treating agent, in the other the liquid of the dispersed phase is collected.

The functional characteristic of the form claimed in the present application is the lifting of the granular solid from the bottom of the vessel and its return to and distribution through the upper portion of the layer of emulsion, through which it passes downwardly to again collect at the bottom of the vessel.

Obviously, many lifting devices (including those indicated in Figs. 1 and 2) may be operated at speeds which will produce violent agitation of the liquid body and it is premised that the devices shown shall be operated at such low speed as will avoid undue agitation of the liquid. It is characteristic of my improved method that, as the granular solid is moved within the apparatus as a substantially separated body, there is no necessary relation between the rate of circulation and the speed of the circulating mechanism, the rate being increased to any desired extent without increase of speed by mere enlargement of the capacity of the buckets, vanes or other lifting device. This is not true in the agitation methods, where the lifting action varies with the velocity of the suspending medium.

While I do not restrict my invention to the treatment of petroleum emulsions, it being adapted to use with any emulsion or intimate mixture which may be resolved by means of solid granular agents, the characteristics of petroleum-water emulsions are so well known and the method is so well adapted to their treatment that I will describe the method in that connection, with the understanding that for "oil" in this description we may read the lighter liquid of any emulsion, and for "water" the heavier liquid thereof. The term "granular solid" in this description and in the claims includes any solid body having the property of resolving emulsions primarily by physical forces, such solid being natural or artificial, being sufficiently hard and sufficiently insoluble to retain its granular form in the described use, and being specifically heavier than the heavier liquid of the emulsion.

Figs. 1 and 2 show dissimilar devices functioning in a substantially identical manner. Referring to Fig. 1, 10 is a stationary shell, which may be open or may be closed at the top as preferred. A pipe 11 controlled by a valve 12 serves to introduce emulsion from any source of supply not shown. A pipe 13 controlled by a valve 14 serves to withdraw coalesced water and a pipe 15 controlled by a valve 16 serves to withdraw cleaned oil. Sight glasses 17 and 18 indicate respectively the upper level of liquid in the apparatus and the parting line between oil and water. A conventional bucket elevator 19, operated by means not shown, is arranged so that the buckets approach the bottom of the vessel and dip up bodies of granular solid, as at G, raising these bodies through the two liquid layers, as at H, and discharging them at any desired upper point I, which may be above or below the upper liquid level E.

The apparatus shown in Fig. 2 is the cross-section of a revolving cylinder in which the vanes L, N and O perform the same function as the buckets H of Fig. 1, the only difference being that in the apparatus of Fig. 2 the solids are carried up the side of the shell instead of through the center as in Fig. 1. The shell in Fig. 2 may be provided with suitable inlet, outlet and level gauge connections, carried through a stationary plate fitted in the revolving heads.

In operating my method in either form of apparatus a sufficient dose of granular solid is placed in the shell, the dose being immaterial to the present invention so long as it is sufficient to maintain at least a small quantity of solids on the bottom of the shell during operation. Most emulsions treat more easily in the presence of a body of the dispersed liquid and in starting up a new apparatus it is desirable to introduce enough water, or a saline solution similar to that of the emulsion, to establish such body in advance, though, if preferred, it may be permitted to slowly accumulate by resolution and coalescence. The shell is then filled to the desired height with the emulsion to be treated, this height being preferably just above the oil outlet pipe 15.

The circulating mechanism is then started, the granular solid being picked up from the bottom of the water layer and returned to the top of the oil layer. If the buckets or vanes are of permeable material (such as wire screen) the water will drain away as the buckets reach the oil level, leaving only adherent water on the grains, while if they are impermeable, the grains will form a slush which will pour from the bucket as it tilts in approaching upper center. The first condition favors the dispersion through the emulsion of coarser grains, the latter of finer meshes, and either may be preferable in different instances.

In their downward travel (by gravitation) through the emulsion the grains collide with the dispersed water particles and such of the grains as are preferentially water-wettable lay hold of the dispersed water particles and carry them downwardly into the water layer, with which they immediately coalesce. If any of the grains are preferentially oil-wettable, they lose all but an adsorbed skin of oil on passing into the water layer. The solid agent used may be preferentially water-wettable only, or may consist of two substances, one preferentially wetted by water, the other by oil.

By the constant removal of water from the emulsion layer and its coalescence with the water layer, the latter is constantly increased in volume and when the parting level reaches the desired height, a slow stream of water is withdrawn through pipe 13, this stream being so adjusted as to maintain the parting level constant in the sight glass.

By the removal of water from the emulsion layer and by the dragging down of emulsion particles by the downward movement of the solids, the upper portion of the oily layer is soon freed from emulsion and may be withdrawn through pipe 15 at such rate as to avoid withdrawal of unbroken emulsion. It is permissible to withdraw oil containing relatively large drops of water for settlement outside the treating vessel, the capacity of the treater being thus materially increased when the gravity difference between the water and the oil is so slight that the coalesced water settles out more slowly than it is produced by resolution.

In either case the stream of entering emulsion is so adjusted as to equal the combined withdrawal of water and oil.

As the solid agents used are not consumed or waste away very slowly, the above described operation is continuous over long periods. It might also be made intermittent, were there any object in doing so, by treating a batch to the point of complete resolution and withdrawing the products, leaving the solid, and preferably the water layer, for the treatment of the next batch.

I claim as my invention:

1. A method of treating an emulsion with granular solids having a specific gravity differing from that of said emulsion: establishing in a vessel a liquid body of said emulsion and a body of said solids; mechanically conveying said solids in a substantially separated form from the level to which said solids gravitate to another level in said liquid body, and releasing said solids at second said level to return by gravitation to first said level.

2. A method of treating an emulsion with granular solids having the property of resolving said emulsion into its constituents and having a specific gravity differing from that of said emulsion: establishing in a vessel a liquid body of said emulsion and a body of said solids; mechanically conveying said solids in a substantially separated form from the level to which said solids gravitate to another level in said liquid body; releasing said solids at second said level to return by gravitation to first said level, and continuing said conveying and releasing until said emulsion is sufficiently resolved.

3. A method of treating an emulsion with granular solids specifically heavier than said emulsion: establishing in a vessel a liquid body of emulsion to be treated and a body of said solids; mechanically lifting said solids from the lower to the upper portion of said liquid body, and there releasing them to subside through said liquid.

4. A method of treating an emulsion with granular solids specifically heavier than said emulsion and having the property of resolving said emulsion into its constituents: establishing in a vessel a liquid body of emulsion to be treated and a body of said solids; mechanically lifting said solids from the lower to the upper portion of said liquid body and there releasing them to subside through said liquid, and continuing said lifting and releasing until said emulsion is sufficiently resolved.

5. A continuous method of treating an emulsion with granular solids having the property of resolving said emulsion into its constituents: establishing in a vessel a liquid body of said emulsion and a body of said solids; mechanically lifting said solids from the lower to the upper portion of said liquid body and releasing said solids to subside through said liquid body, whereby said emulsion is repeatedly contacted with said solids and is thereby resolved; withdrawing the resolved constituents at substantially the rate at which they are set free, and replenishing the supply of emulsion at substantially the rate at which it is resolved.

6. A method of treating an oil-water emulsion with granular solids having the property of resolving said emulsion into its constituents: establishing in a vessel a liquid body of said emulsion; contacting with said emulsion granular solids; retaining in said vessel a layer of water beneath an oily layer containing emulsion; distributing in said oily layer a supply of said solids, said solids subsiding through both said layers to the bottom of said vessel; and continuously returning said solids from said water layer to said oily layer while maintaining said layers substantially separated.

7. A continuous method of treating an emulsion with a granular solid: feeding emulsion to a liquid body in which resolution is effected by contact with said solid; withdrawing the products of said resolution at a combined rate substantially equal to the rate of said feed, and continuously contacting said solid with said liquid body by continuously mechanically lifting said solid from the bottom to an upper portion of said body and distributing said solid through said upper portion to subside through said liquid body.

8. A continuous method of treating an oil-water emulsion with a granular solid having a specific gravity differing from that of said emulsion: feeding emulsion to a liquid body in which resolution is effected by contact with said solid; withdrawing resolution products at such rate as to retain a layer of water in the lower portion of said liquid body; distributing said solid through said liquid body at some predetermined level therein other than that which said solid will assume by gravitation, and continuously mechanically returning said solid from said gravitation level to said predetermined level.

9. A continuous method of treating an oil-water emulsion with a granular solid; feeding emulsion to a liquid body in which resolution is effected by contact with said solid; withdrawing resolution products at such rate as to retain a layer of water in the lower portion of said liquid body; distributing said solid through the oily layer overlying said water layer to subside through both said layers, and continuously mechanically withdrawing said solid from beneath said water layer and returning it to be distributed through said oily layer.

10. A method of treating an emulsion with a granular solid having the property of resolving said emulsion into its constituents: establishing in a vessel a liquid body of said emulsion; contacting said solid with said emulsion whereby said emulsion is progressively resolved by coalescence of particles of the dispersed phase; maintaining in said vessel substantially separated layers of the coalesced liquid and of incompletely resolved emulsion; passing said solid through said emulsion layer while maintaining said coalesced layer in a state of relative quiescence, and continuously withdrawing said solid from said coalesced layer and returning it to said emulsion layer to be passed therethrough.

11. A method of treating an emulsion with a granular solid: establishing a retained liquid body of said emulsion; maintaining in said liquid body an incoherent mass of said solid; rotating said solid about the horizontal axis of said body to move and to distribute said solid within said liquid, and maintaining said liquid substantially quiescent during said rotation.

12. A method of treating an emulsion with a granular solid: establishing a retained body of said liquid; maintaining in said liquid body an incoherent mass of said solid, and rotating said solid about the horizontal axis of said body to move portions of said solid from its position of rest, and releasing said solid at another vertical position within said body.

13. A method of treating an emulsion with a granular solid having the property of resolving said emulsion into its constituents: establishing a retained liquid body of said emulsion; maintaining in the lower portion of said body an incoherent mass of said solid; rotating said solid about the horizontal axis of said body to lift portions of said solid from the lower portion to an upper portion of said body, whereby said solid is repeatedly contacted with said emulsion, and continuing said rotation until said emulsion is substantially resolved by contact with said solid.

14. A continuous method of treating an emulsion with a granular solid having the property of resolving said emulsion into its constituents: feeding said emulsion to one end of a retained liquid body of said emulsion and resolution products thereof; maintaining in the lower portion of said body an incoherent mass of said solid; rotating said solid about the horizontal axis of said body to lift portions of said solid from the lower portion of said liquid body to an upper portion thereof, said solid subsiding through said liquid by gravity difference, whereby portions of said emulsion are continuously resolved, and continuously withdrawing resolution products from the opposite end of said liquid body.

15. A method of treating an emulsion with granular solids: establishing a retained liquid body of emulsion to be treated; contacting with said emulsion granular solids having the property of resolving said emulsion into its constituents; maintaining in said body layers of substantially separated resolution products and emulsion; moving a portion of the solid to one of said layers while maintaining the liquid body in a state of relative quiescence; tumbling said solid in said liquid body in such manner as to assist cleansing of said solid by abrasion; continuously withdrawing said solid from a layer of liquid composed of the coalesced product of resolution and returning it to be distributed through the remaining untreated emulsion.

WILLIAM F. VAN LOENEN.